United States Patent [19]

Weis et al.

[11] Patent Number: 4,546,661
[45] Date of Patent: Oct. 15, 1985

[54] COUNTERSHAFT DRIVEN POWER TAKE-OFF

[75] Inventors: Philip J. Weis, Sylvania, Ohio; Richard A. Cook, Gregory, Mich.

[73] Assignee: Dana Corporation, Toledo, Ohio

[21] Appl. No.: 569,112

[22] Filed: Jan. 9, 1984

[51] Int. Cl.⁴ .................................. F16H 37/00
[52] U.S. Cl. ........................... 74/15.4; 74/15.6; 74/325; 74/377
[58] Field of Search .............. 74/376, 377, 11, 15.4, 74/15.6, 15.63, 325

[56] References Cited

U.S. PATENT DOCUMENTS

| | | | |
|---|---|---|---|
| 1,442,057 | 1/1923 | Eggert | 74/376 |
| 2,218,368 | 10/1940 | Wagner | 192/51 |
| 2,221,387 | 11/1940 | Smith | 74/11 |
| 2,314,549 | 3/1943 | Milbrath | 74/376 |
| 2,553,826 | 5/1951 | Martin | 74/376 X |
| 2,585,114 | 2/1952 | Gredell | 74/376 |
| 3,089,574 | 5/1963 | Howard | 192/48 |
| 3,464,277 | 9/1969 | Longshore | 74/15.4 |
| 3,507,372 | 4/1970 | Gilbertson et al. | 74/15.4 X |
| 3,991,629 | 11/1976 | Dearnley | 74/15.4 |
| 4,208,923 | 6/1980 | Ikegami | 74/15.63 |

FOREIGN PATENT DOCUMENTS

| | | | |
|---|---|---|---|
| 1625179 | 6/1970 | Fed. Rep. of Germany | 74/325 |
| 510212 | 7/1939 | United Kingdom | 74/376 |
| 1190810 | 5/1970 | United Kingdom | 74/325 |

*Primary Examiner*—Leslie A. Braun
*Assistant Examiner*—Dwight G. Diehl
*Attorney, Agent, or Firm*—Harold D. Shall

[57] ABSTRACT

A power take-off (PTO) unit with parallel input and output shafts mounted in a PTO case with the input shaft adapted to be piloted in the countershaft of a transmission and the PTO case adapted to be secured to the transmission case. An input gear is slidably splined on the input shaft adjacent its piloted end, and the input shaft also carries an input sprocket. On the output shaft is rotatably mounted an output gear which is geared to the input gear and an output sprocket drivingly connected to the input sprocket by a chain drive. A clutch carried by the output shaft alternately clutches the output gear or output sprocket to the output shaft while the input gear has a clutch portion thereon and is slidable to engage a clutching member carried by the countershaft to drivingly connect the countershaft to the PTO input shaft.

1 Claim, 1 Drawing Figure

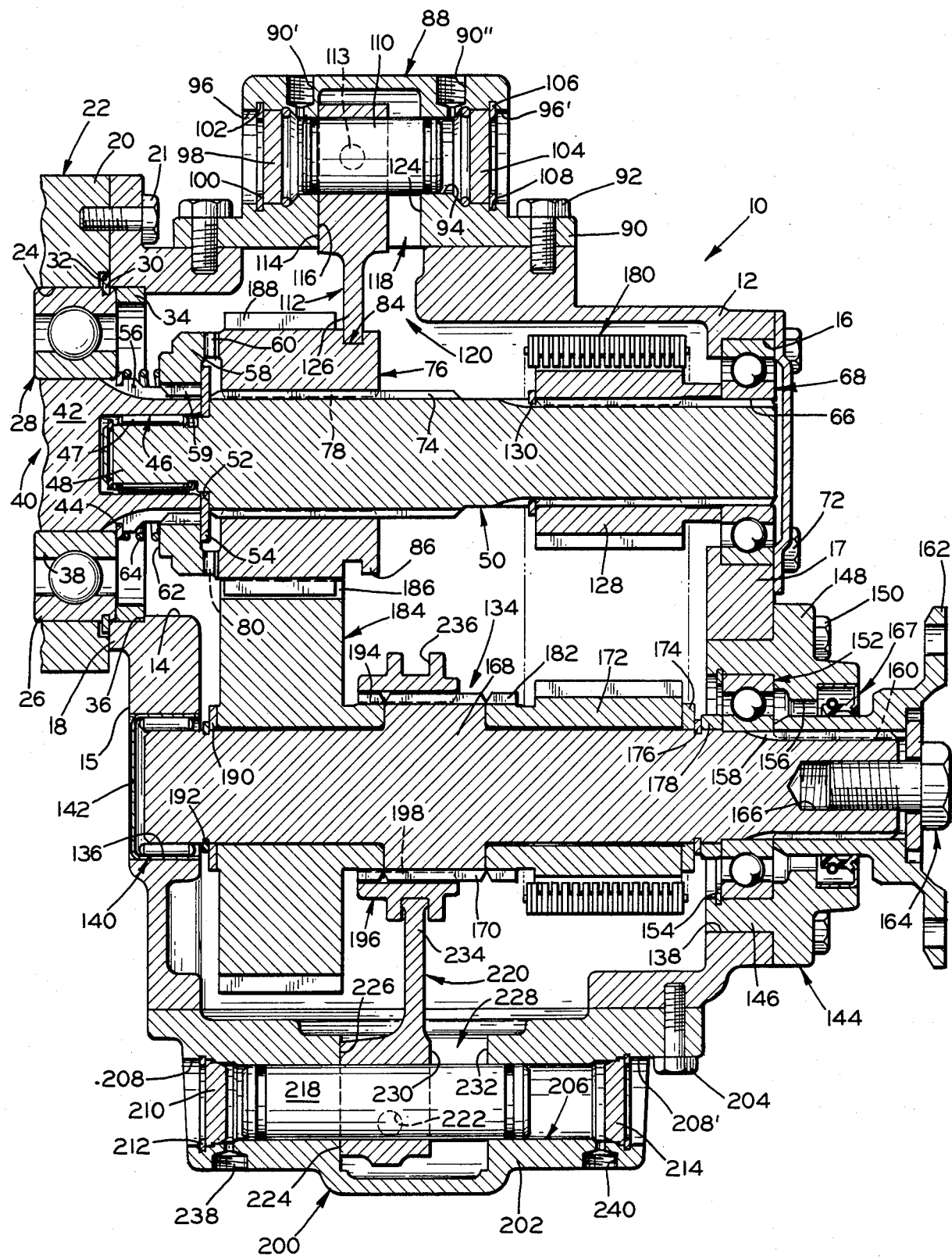

COUNTERSHAFT DRIVEN POWER TAKE-OFF

BACKGROUND OF THE INVENTION

1. Field of the Invention

The present invention relates to countershaft driven power take-off (PTO) units and in particular such a unit providing a forward and reverse drive and neutralizing of the input to the PTO unit with a minimum of gears, shafts and a chain drive.

2. Description of Prior Art

PTO units using input clutches to the PTO unit are well known in the art. Also PTO units and gear boxes utilizing a gear train and a chain drive for obtaining forward and reverse drive between the input and output of the PTO unit are well known in the art; however, none of these latter units is a countershaft driven PTO unit and uses a member of the gear train, carried by the PTO input shaft as a shiftable member to engage and disengage the PTO from a driving relationship with the transmission countershaft which is adapted to drive the input shaft of the PTO unit.

SUMMARY OF THE INVENTION

The present invention relates to a countershaft driven PTO unit wherein the input shaft of the PTO is adapted to be piloted in the end of a transmission countershaft which is operative to selectively drive the PTO. The PTO includes parallel input and output shafts with two alternate drives connecting the same. An input gear on the PTO input shaft is meshed with an output gear on the PTO output shaft. A chain drive sprocket gear is carried by the input shaft and a mating output sprocket gear is carried by the output shaft with a chain drive therebetween. A clutch mechanism is operative to alternately clutch the output gear or the output sprocket to the output shaft for providing reverse or forward drive between the PTO input and output shafts, while the PTO input gear is also slidably mounted on the input shaft and clutchingly engageable and disengageable with another clutch member carried by the countershaft to thereby drivingly connect or disconnect the PTO from the countershaft. Thus, with a very nominal number of parts, a forward and reversing PTO which is capable of input shaft neutralization has been provided.

BRIEF DESCRIPTION OF THE DRAWINGS

The FIGURE is a vertical sectional view through the longitudinal axes of the input and ouput shafts of a PTO unit embodying the invention, with a fragment of a transmission case and countershaft being shown attached thereto.

DESCRIPTION OF THE PREFERRED EMBODIMENT

A PTO unit is shown generally at 10 and includes a PTO housing or case 12. In the upper portion of the case 12 is a pair of axially aligned bores 14 and 16; the bore 14 being in the forward end wall 15 of the case 12 while the bore 16 is in the rearward end wall 17 of the case.

The bore 14 is surrounded by an annular shoulder 18 which is adapted to abuttingly engage a mating annular shoulder 20 of a transmission case shown fragmentarily at 22. The shoulders 18 and 20 are securely bolted together in a conventional manner as by a plurality of circumferentially spaced bolts, one of which is shown at 21. The bolt 21 is shown rotated from its proper position for illustration purposes; that is, it would be located clockwise or counter clockwise from the position shown in the drawings.

The shoulder 20 has a bore 24 therein which is coaxial with the bore 14 and has pressed therein the outer race 26 of a ball bearing assembly 28. A snap ring 30 in a peripheral groove in the outer race of the bearing 28 is received in a groove 32 in the right side of the shoulder 20 to axially position the bearing 28 relative to the transmission case 22. An annular spacer 34, received in the bore 14 and abutting on its right side a counterbore shoulder 36, abuts on its left side the bearing 28 to thereby position the bearing relative to the PTO case 12.

The bearing 28 has an inner race 38, and pressed in and supported by the inner race 38 is the right or outer end 40 of the transmission countershaft 42. A snap ring 44 disposed in a groove in the outer surface of the countershaft 42 engages the right side of the inner race 38 to position the race relative to the countershaft. The outer end of the countershaft 42 has a pilot bore 46 therein which contains a caged roller bearing assembly 47; the latter in turn receives a reduced pilot end 48 formed on the forward end of a PTO input shaft 50. The roller bearing assembly 47 mounts the input shaft 50 in the countershaft for relative rotation. At the right end of the pilot end 48 is a shoulder 52 and between the shoulder 52 and the right end of the countershaft 42 is a flat washer 54.

The periphery of the countershaft adjacent to its right end is splined as shown at 56, and mounted on the spline 56 is a clutch collar 58 by means of an internal splined bore 59 of the clutch collar. The clutch collar 58 has an annulus of face coupling clutch teeth 60 on the right face thereof, which teeth are adjacent to the periphery of the collar 58. The right face of the collar 58 radially inwardly of the coupling teeth 60 abuts the left side of the flat washer 54, while the left face 62 of the clutch collar engages a compression coil spring 64 compressed between the left face 62 and the snap ring 44. The spring 64 acts to cushion clutching engagement of the collar 58 as hereinafter described.

The PTO input shaft extends axially in the case 12 and the right end thereof is received in the bore 66 of a ball bearing assembly 68, while the outer race of the bearing assembly is pressed into the bore 16 in the PTO case 12. A bearing cap 70 is conventionally secured to the case 12 surrounding the bore 16, as by a plurality of bolts 72, to seal the bore 16 and to engage and position the right side of the bearing assembly 68.

The input shaft 50, to the right of the shoulder 52 has a peripheral spline 74. An input gear 76, having internal splines 78, is splined on the splines 74 of the input shaft for unitary rotation and relative axial movement. The left face of the input gear 76 has face coupling clutch teeth 80 formed thereon which can mate with the face coupling teeth 60 on the clutch collar 58 to thereby form an input clutch to the PTO 10. When the gear 76 is shifted to the left, as seen in the drawing, the coupling teeth 60 and 80 are engaged and the countershaft 40 can drive the input gear 76 and through the latter, the input shaft 50.

The input gear 76 has peripheral teeth 188 more fully described hereinafter, and an annular shifter groove 84 formed in the right side of the gear 76 in a shoulder 86 immediately to the right of the teeth 188.

Shifting means shown generally at 88 are provided to shift the gear 76 between its engaged or forward position as seen in the drawings, to its disengaged position, which is to the right or rearward of the position shown in the drawings. In the disengaged position, the face coupling teeth 60 and 80 are axially spaced from each other and the collar 58 cannot drive the gear 76. At this time, the PTO is effectively neutralized and no portion of the PTO is being driven by the countershaft 40 except for the clutch collar 58.

The shifter means 88 includes a housing 90 bolted to the PTO case 12 by a plurality of bolts 92; the bolts 92 and the bolts 21 being positioned so that they do not interfere with each other and the bolts 21 are displaced circumferentially from the housing 90 in a well known manner.

The housing 90 has a central axially extending bore 94, which bore has counter bores 96—96' at the opposed ends thereof. A left end plate 98 is sealingly disposed in the counterbore 96 and secured therein by a snap ring 100 received in a snap ring groove 102 in the counterbore 96, while a right end plate 104 is sealingly received in the counterbore 96' and secured therein by a snap ring 106 received in a snap ring groove 108 in the counterbore 96'. Disposed in the central bore 94 is a piston 110 having conventional O-rings in periphery thereof adjacent the ends of the piston, which O-rings sealingly engage the bore 94. Mounted on the piston 110 is a shift fork 112 which is conventionally secured to the piston by a bolt (not shown) threaded in an opening 113 in the fork 112 and engaging the piston 110. The shift fork 112 has a front shoulder 114 adapted to engage the left or rearward facing face 116 of an opening 118 in the housing 90 superimposed on an opening 120 in the housing 12, which engagement limits the forward movement of the shift fork 112 and piston 110. The fork 112 has a rear shoulder 122 adapted to engage the right or forwardly facing face 124 of the opening 118 which engagement limits the rearward travel of the fork 112 and piston 110. The fork 112 has a depending portion 126 extending into and engaging the groove 84 in the gear 76. When the fork 112 is moved forwardly and rearwardly the gear 76 moves unitarily therewith.

A tapped opening 90' is formed in the housing 90 immediately to the right of the end plate 98, while a tapped opening 90" is formed in the housing 90 immediately to the left of the end plate 104. The openings 90' and 90" communicate with the bore 94 in the housing 90. A shifter control system (not shown) supplies pressure fluid to the opening 90' while venting opening 90" to force piston 110 to the right and, alternatively, supplies pressure fluid to opening 90" while venting opening 90' to force piston 110 to the left.

The right end of the input shaft 50, to the left of the bearing 68, has spliced thereon for unitary rotation, a driving sprocket 128. A snap ring 130 secured in the periphery of the shaft 50, abuts the left side of the sprocket 128, while an annular shoulder 132 on the right side of the sprocket engages the bearing 68, so that the sprocket 128 is fixed against axial movement relative to the shaft 50.

A PTO output shaft 134 is rotatably mounted in the PTO case 112 directly below the input shaft 50. More particularly, a pair of axially aligned bores 136 in the forward end wall 15 and 138 in the rearward end wall 17, rotatably receive the output shaft 134. In the bore 136 is disposed a self contained roller bearing 140 which includes a cup shaped cage 142 pressed in the bore 136 which cage has an enclosed left end so that the cage 142 seals the bore 136. Rotatably mounted in the bearing 142 is the left end of the shaft 134. Adjacent the right bore 138 is disposed a bearing cap 144 which has an annular forwardly extending shoulder 146; the periphery of the shoulder being snugly received in the bore 138. An annular flange 148 of the bearing cap 144 extends outwardly of the shoulder 146 and is secured to the PTO case 12 by a plurality of bolts 150. A ball bearing assembly 152 is pressed into the annular shoulder 146 and secured therein in a conventional manner by a snap ring 154 carried in a groove in the shoulder 146.

The right end of the output shaft 134 is pressed through the bearing assembly 152 and projects beyond the right side of the PTO case 12 in a spaced relationship to the central opening 156 of the bearing cap 144. The right end of the output shaft 134 is peripherally splined at 158, and received thereon are the internal splines of a conventional output flange 162. A bolt and washer assembly 164 engage the right side of the flange 162; the bolt being threaded into a threaded opening 166 in the end of the output shaft 134. A lip seal 167 is pressed into the bearing cap 144 and engages the flange 162 to seal the opening therebetween.

Formed centrally and integrally on the shaft 134 is a raised portion 168 which has peripheral splines 170 thereon. To the right of the portion 168, a driven sprocket member 172 is rotatably mounted on the shaft 134. The left side of the sprocket 172 abuts the right side of the raised portion 168, while the right side of the sprocket 172 auts a bushing 174, which bushing, in turn, abuts a snap ring 176 carried in a groove in the periphery of the shaft 134. An annular spacer 178 is disposed about the periphery of the shaft 134 and abuts the right side of the snap ring 176 while the right side of the spacer 178 abuts the left side of the inner race of the ball bearing assembly 152. It is thus seen that when the bearing cap 144 is secured to the case 12 and the flange 162 is bolted to the end of the output shaft 134, the various members to the right of the raised portion 168 of the output shaft cooperate to rotatably mount and axially position the output shaft.

The periphery of the driving sprocket 128 and the periphery of the driven sprocket 172 are conventionally toothed to drivingly receive a chain drive 180, so that the sprockets 128 and 172 rotate in the same direction. The left peripheral face of the sprocket 172 has peripheral clutch tooth splines 182 thereon which are of a cooperating diameter relative to the peripheral splines 170 on the raised portion 168.

To the left or forward of the raised portion 168 is rotatably mounted on the output shaft 134 a driven gear 184 which has peripheral gear teeth 186 thereon meshed with the peripheral gear teeth 188 on the input gear 76, so that the gear 184 is driven by the gear 76 but rotates in the opposite direction. To the left of and engaging the gear 184 is a bushing 190 which, in turn, on its left engages a snap ring 192 secured in a snap ring groove in the periphery of the shaft 134. The right peripheral surface of the drive gear 184 has formed thereon peripheral clutch teeth splines 194 which are of a cooperating diameter relative to the peripheral splines 170 on the raised portion 168.

A clutch collar 196, having internal splines 198, is splined on the peripheral splines 170 and is of a width substantially the same as the raised portion 168. When the clutch collar 196 is moved to the left or forwardly, the internal splines 198 thereof simultaneously engage the clutch splines 194 on the driven gear 184 and the splines 170 on the output shaft 134 to drivingly connect the gear 184 to the shaft 134, the shafts 50 and 134 will rotate in opposite directions. When the clutch collar 196 is moved to the right or rearwardly, the internal splines 198 thereof simultaneously engage the clutch splines 182 on the driven sprocket 172 and the splines 170 on the output shaft 134 to drivingly connect the sprocket 172 to the shaft 134 and the shafts 50 and 134 will rotate in the same direction.

Shifting means shown generally at 200 are provided to shift the clutch collar 196 between its leftward and rightward positions and includes a housing 202 bolted to the PTO case 12 by a plurality of bolts, one of which is shown at 204. The housing 202 has a central axially extending bore 206 which central bore has counter bores 208—208' at the opposite ends thereof. A left end plate 210 is sealingly disposed in the counterbore 208 and secured therein by a snap ring 212 secured in a groove in bore 208 to the left of the plate, while a right end plate 214 is sealingly received in the counterbore 208' and secured therein by a snap ring 216 secured in a groove in the bore 208' to the right of the plate 214. Disposed in the central bore 206 is a piston 218 having conventional O-rings in the opposite ends thereof to sealingly engage the bore 206.

Mounted on the piston 218 is a shift fork 220 conventionally secured thereto by a bolt (not shown) threaded in an opening 222 in the fork 220 and engaging the piston 110. The shift fork 220 has a forward shoulder 224 adapted to engage the rearwardly facing face 226 of an opening 228 in the housing 202, which engagement limits the forward travel of the shift fork 220. The fork 220 has a rear shoulder 230 adapted to engage the forwardly facing face 232 of the opening 228 which abutting limits the rearward travel of the fork 220. The fork 220 has an upwardly extending portion 234 extending into and engaging a peripheral groove 236 in the clutch collar 196.

When the fork 220 is moved forwardly, it moves the clutch collar 196 to engage gear 184, while when the fork 220 is moved rearwardly, the clutch collar engages the sprocket 172.

A tapped opening 238 is formed through the housing 202 immediately to the right of the end plate 210, while a tapped opening 240 is formed through the housing 202 immediately to the left of the end plate 214. A shifter control system (not shown) supplies pressure fluid to the opening 238 while venting the opening 240 to force the piston 218 rearwardly and, alternatively, supplies pressure fluid to the opening 240 while venting the opening 238 to force piston 218 to the left.

What is claimed is:

1. A power take-off unit to be driven by the rear end of a transmission countershaft, comprising a PTO housing adapted for connection to the rear end of the transmission case and to receive the rearward end of the transmission countershaft, an input shaft rotatably mounted in said PTO housing in a location coaxial with the countershaft, an output shaft rotatably mounted in said PTO housing parallel to said input shaft, an input gear mounted on the forward end of said input shaft for unitary rotation therewith and axial movement relative thereto, an output gear rotatably mounted on the forward end of said output shaft and directly meshed with said input gear so that said input and output gears form a gear drive first connection between said input and output shafts, first clutch means including a first clutch element adapted to be drivingly connected for unitary rotation to a rear end of the countershaft and a second clutch element which is formed as a part of said input gear, said first and second clutch elements being engaged upon forward movement of said input gear on said input shaft and becoming disengaged upon rearward movement of said input gear, an input sprocket mounted on said input shaft for unitary rotation at a location rearward of said input gear, an output sprocket rotatably mounted on said output shaft rearwardly of said output gear, a chain drive directly drivingly connected to said sprockets to form a second connection between said input and output shafts and second clutch means a mounted on said output shaft for drivingly connecting the selected one of said output gear and said output sprocket to said output shaft to provide a forward or reverse rotation of said output shaft.

* * * * *